(12) United States Patent
Ikemoto et al.

(10) Patent No.: US 12,104,007 B2
(45) Date of Patent: Oct. 1, 2024

(54) ALLOPHANATE GROUP-CONTAINING POLYISOCYANATE COMPOSITION, POLYURETHANE RESIN-FORMING COMPOSITION, SEAL MATERIAL, MEMBRANE MODULE

(71) Applicant: TOSOH CORPORATION, Yamaguchi (JP)

(72) Inventors: Mitsushige Ikemoto, Mie (JP); Futoshi Oota, Mie (JP)

(73) Assignee: TOSOH CORPORATION, Yamaguchi (JP)

( * ) Notice: Subject to any disclaimer, the term of this patent is extended or adjusted under 35 U.S.C. 154(b) by 773 days.

(21) Appl. No.: 17/262,150

(22) PCT Filed: Jul. 24, 2019

(86) PCT No.: PCT/JP2019/029110
§ 371 (c)(1),
(2) Date: Jan. 21, 2021

(87) PCT Pub. No.: WO2020/022408
PCT Pub. Date: Jan. 30, 2020

(65) Prior Publication Data
US 2021/0301070 A1    Sep. 30, 2021

(30) Foreign Application Priority Data

Jul. 25, 2018   (JP) ................... 2018-139332

(51) Int. Cl.
*C08G 18/76* (2006.01)
*B01D 63/04* (2006.01)
(Continued)

(52) U.S. Cl.
CPC ......... *C08G 18/7671* (2013.01); *B01D 63/04* (2013.01); *B01D 69/08* (2013.01);
(Continued)

(58) Field of Classification Search
CPC .............. C10M 109/00; C10M 159/00; C10M 171/02; C10M 171/06; B05C 7/02;
(Continued)

(56) References Cited

U.S. PATENT DOCUMENTS 5,235,018 A * 8/1993 Potter ................ C08G 18/7837
544/193
5,326,845 A   7/1994 Linden
(Continued)

FOREIGN PATENT DOCUMENTS

CN   1396958 A   2/2003
CN   101213258 A   7/2008
(Continued)

OTHER PUBLICATIONS

Jinghua et al., "Preparation of Reactive Polyurethane Hot-melt Adhesive for Auto-lamps", China Academic Journal Electronic Publishing House, 2020, pp. 12-14, with English abstract, 3 pages.
(Continued)

*Primary Examiner* — Taiwo Oladapo
(74) *Attorney, Agent, or Firm* — Squire Patton Boggs (US) LLP

(57) ABSTRACT

An allophanate group-containing polyisocyanate composition that contributes to the formation of a polyurethane resin with fewer bubbles is provided.
Disclosed is an allophanate group-containing polyisocyanate composition (C) including a reaction product of diphenylmethane diisocyanate (A) and a hydroxyl group-containing compound (B), wherein the hydroxyl group-containing compound (B) includes a hydroxyl group-containing polymethylsiloxane compound (B-1) in an amount of 1 ppm or more and 300 ppm or less.

7 Claims, 1 Drawing Sheet

(51) Int. Cl.
*B01D 69/08* (2006.01)
*C08G 18/28* (2006.01)
*C08G 18/61* (2006.01)
*C09K 3/10* (2006.01)

(52) U.S. Cl.
CPC ....... *C08G 18/2825* (2013.01); *C08G 18/283* (2013.01); *C08G 18/61* (2013.01); *C09K 3/1021* (2013.01); *B01D 2313/04* (2013.01); *B01D 2319/02* (2013.01); *C09K 2200/0685* (2013.01)

(58) Field of Classification Search
CPC .... B65D 23/02; B65D 25/14; C10N 2020/02; C10N 2020/077; B05D 1/02; B05D 7/227; B05D 2259/00; B08B 17/06; B05B 3/1007; B05B 9/047; B05B 13/0636; C08G 18/7671; C08G 18/2825; C08G 18/283; C08G 18/61; C08G 18/2835; C08G 18/12; C08G 18/2815; C08G 18/7837; C08G 18/10; C08G 18/6685; B01D 63/04; B01D 69/08; B01D 2313/04; B01D 2319/02; B01D 2313/025; B01D 63/023; C09K 3/1021; C09K 2200/0685

See application file for complete search history.

(56) References Cited

U.S. PATENT DOCUMENTS

| | | | |
|---|---|---|---|
| 5,623,044 A | 4/1997 | Chiao | |
| 5,646,227 A * | 7/1997 | Slack | ................ C08G 18/8054 528/21 |
| 5,691,439 A | 11/1997 | Slack et al. | |
| 2005/0222368 A1 | 10/2005 | Reiners et al. | |
| 2007/0032626 A1 | 2/2007 | Roesler et al. | |
| 2007/0112164 A1 | 5/2007 | Roesler et al. | |

FOREIGN PATENT DOCUMENTS

| | | | | |
|---|---|---|---|---|
| CN | 102753595 A | 10/2012 | | |
| CN | 108291001 A | 7/2018 | | |
| EP | 2058355 A1 | 5/2009 | | |
| ES | 2351418 T3 * | 2/2011 | ........... | C08G 18/289 |
| IN | 10220/DELNP/2007 | 6/2008 | | |
| JP | H05-25246 A | 2/1993 | | |
| JP | H08-292694 | 11/1996 | | |
| JP | H09-136939 A | 5/1997 | | |
| JP | 2002-145982 A | 5/2002 | | |
| JP | 2009-030059 A | 2/2009 | | |
| JP | 2009-073882 A | 4/2009 | | |
| JP | 2014-193945 A | 10/2014 | | |
| JP | 2015-052041 A | 3/2015 | | |
| JP | 2017-122192 A | 7/2017 | | |
| JP | 2018-076439 A | 5/2018 | | |
| JP | 2018-095875 A | 6/2018 | | |
| JP | 2018-119084 A | 8/2018 | | |
| WO | WO 2012/023358 A1 | 2/2012 | | |

OTHER PUBLICATIONS

International Search Report and Written Opinion for International Application No. PCT/JP2019/029110, 18 pages with translation, dated Sep. 17, 2019.

International Preliminary Report on Patentability for International Application No. PCT/JP2019/029110, 9 pages with translation, dated Jan. 26, 2021.

Extended European Search Report for European Patent Application No. 19840517.7 date Mar. 16, 2022, 12 pages.

Tian et al., Synthesis and Properties of Polyurethane Modified with Hydroxyl Terminated Polysiloxane, Advanced Materials Research, vol. 335-336, 2011, pp. 881-885, XP055314511, 6 pages.

India Examination Report under Sections 12 & 13 of the Patents Act, 1970 and the Patent Rules, 2003, for India patent application No. 202147003393, date mailed Mar. 19, 2021, with translation, 6 pages.

* cited by examiner

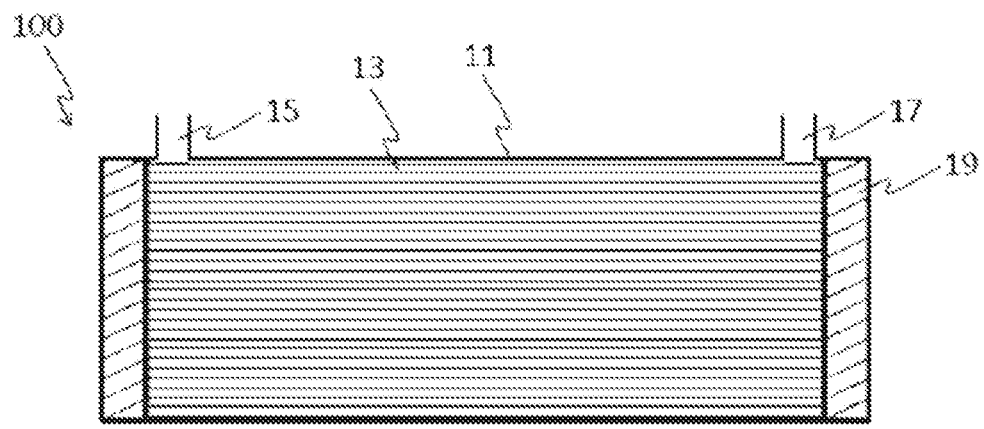

ALLOPHANATE GROUP-CONTAINING POLYISOCYANATE COMPOSITION, POLYURETHANE RESIN-FORMING COMPOSITION, SEAL MATERIAL, MEMBRANE MODULE

CROSS-REFERENCE TO RELATED APPLICATIONS

This application is a National Stage filing under 35 U.S.C. § 371 of International Patent Application No. PCT/JP2019/029110, filed Jul. 24, 2019, which claims the benefit of priority to JP Application No. 2018-139332, filed Jul. 25, 2018, both applications are incorporated herein by reference in their entirety for all purposes.

TECHNICAL FIELD

The present disclosure relates to an allophanate group-containing polyisocyanate composition, a polyurethane resin-forming composition, a seal material, and a membrane module.

BACKGROUND ART

Membrane modules having hollow fibers or flat membranes as separation membranes are used in a wide range of fields, including industrial fields such as water treatment, medical fields such as blood treatment, and the like. Particularly, the demand for membrane modules is very highly increasing in the applications such as water purifiers, artificial kidney and artificial lung.

Generally, as a membrane seal material that adheres and fixes the end parts of a membrane module which uses hollow-shaped or flat membrane-shaped fiber separation membranes, polyurethane resins that are excellent in terms of flexibility at normal temperature, adhesiveness, and chemical resistance are widely used. For the polyurethane resins used for such use applications, there is an increasing demand for lowering the viscosities of polyisocyanate and polyol in order to enhance the productivity of membrane modules.

Patent Literature 1 discloses an allophanate group-containing polyisocyanate derived from diphenylmethane diisocyanate (MDI) and a monool. The allophanate group-containing polyisocyanate according to Patent Literature 1 has low viscosity, causes less precipitation of MDI at low temperature, and is easily handleable. Therefore, the allophanate group-containing polyisocyanate is useful in the fields such as adhesives and seal materials and has been widely applied.

CITATION LIST

Patent Literature

Patent Literature 1: Japanese Unexamined Patent Publication No. 2009-030059

SUMMARY OF INVENTION

Technical Problem

However, in a polyurethane resin-forming composition that uses an allophanate group-containing polyisocyanate derived from MDI and a monool, since the defoaming properties are poor, there is a problem that bubbles are likely to remain in the cured polyurethane resin.

An embodiment of the present disclosure is directed to providing an allophanate group-containing polyisocyanate composition and a polyurethane resin-forming composition, both of which contribute to the formation of a polyurethane resin with fewer bubbles. Furthermore, another embodiment of the present disclosure is directed to providing a seal material including a cured product of the polyurethane resin-forming composition, and a membrane module that is sealed by the seal material.

Solution to Problem

An allophanate group-containing polyisocyanate composition (C) according to an embodiment of the present disclosure includes a reaction product of diphenylmethane diisocyanate (A) and a hydroxyl group-containing compound (B), wherein the reaction product includes an allophanate group, the hydroxyl group-containing compound (B) includes a hydroxyl group-containing polymethylsiloxane compound (B-1), and a content of the hydroxyl group-containing polymethylsiloxane compound (B-1) is 1 ppm or more and 300 ppm or less with respect to a total amount of the diphenylmethane diisocyanate (A) and the hydroxyl group-containing compound (B).

An allophanate group-containing polyisocyanate composition (C') according to another embodiment of the present disclosure includes a reaction product of diphenylmethane diisocyanate (A) and a monool compound (B'); and a siloxane compound (G), wherein the reaction product includes an allophanate group, and a content of the siloxane compound (G) is 1 ppm or more and 100 ppm or less with respect to a mass of the reaction product.

A polyurethane resin-forming composition according to another embodiment of the present disclosure includes the allophanate group-containing polyisocyanate composition (C) and a polyol component (D).

A seal material according to another embodiment of the present disclosure includes a cured product of the polyurethane resin-forming composition.

A membrane module according to another embodiment of the present disclosure is sealed by the seal material.

Advantageous Effects of Invention

According to an embodiment of the present disclosure, an allophanate group-containing polyisocyanate composition and a polyurethane resin-forming composition, both of which contribute to the formation of a polyurethane resin with fewer bubbles, can be provided. Furthermore, according to another embodiment of the present disclosure, a seal material including a cured product of the polyurethane resin-forming composition, and a membrane module that is sealed with the seal material, can be provided.

BRIEF DESCRIPTION OF DRAWINGS

FIG. 1 is a conceptual diagram illustrating an example of the configuration of a hollow fiber membrane module according to an embodiment of the present disclosure.

DESCRIPTION OF EMBODIMENTS

As a result of intensive studies, the present inventors have found that the above-described problems can be solved by incorporating a hydroxyl group-containing polymethylsiloxane compound or a siloxane compound into an allophanate group-containing polyisocyanate composition of diphenylmethane diisocyanate (MDI).

In the following description, exemplary embodiments for carrying out the present disclosure will be described in detail.

First Embodiment (Allophanate Group-Containing Polyisocyanate Composition)

The allophanate group-containing polyisocyanate composition according to an embodiment of the present disclosure includes a reaction product of diphenylmethane diisocyanate (A) and a hydroxyl group-containing compound (B),
wherein the reaction product includes an allophanate group,
the hydroxyl group-containing compound (B) includes a hydroxyl group-containing polymethylsiloxane compound (B-1), and
a content of the hydroxyl group-containing polymethylsiloxane compound (B-1) is 1 ppm or more and 300 ppm or less with respect to a total amount of the diphenylmethane diisocyanate (A) and the hydroxyl group-containing compound (B).

<Diphenylmethane Diisocyanate (A)>

Regarding MDI (A), any MDI monomer that is commonly available can be used. Isomers of the MDI monomer usually include 0% by mass or more and 5% by mass or less of 2,2'-MDI, 0% by mass or more and 95% by mass or less of 2,4'-MDI, and 5% by mass or more and 100% by mass or less of 4,4'-MDI.

Regarding the MDI (A), it is preferable to use the abovementioned MDI in order to obtain an allophanate group-containing polyisocyanate having a lower viscosity; however, as long as viscosity increase is allowed to some extent, polymethylene polyphenylene polyisocyanate, which is a polymeric MDI, can also be used. The content of polymethylene polyphenylene polyisocyanate in that case is preferably 0% by mass or more and 50% by mass or less in the isocyanate components used. When the content of polymethylene polyphenylene polyisocyanate is 50% by mass or less, the viscosity is suppressed to a lower level, and the production of insoluble matter can be further suppressed.

<Hydroxyl Group-Containing Compound (B)>

The hydroxyl group-containing compound (B) includes a hydroxyl group-containing polymethylsiloxane compound (B-1).

The content of the hydroxyl group-containing polymethylsiloxane compound (B-1) is 1 ppm or more and 300 ppm or less with respect to the total amount of MDI (A) and the hydroxyl group-containing compound (B). When the content of the hydroxyl group-containing polymethylsiloxane compound (B-1) is less than 1 ppm, an effect of reducing bubbles is not sufficiently obtained, and when the content is more than 300 ppm, it is not preferable because the siloxane compound (B-1) is separated and the allophanate group-containing polyisocyanate composition (C) becomes turbid.

The content of the hydroxyl group-containing polymethylsiloxane compound (B-1) is preferably 1 ppm or more and 200 ppm or less, and more preferably 1 ppm or more and 100 ppm or less.

<<Hydroxyl Group-Containing Polymethylsiloxane Compound (B-1)>>

Examples of the hydroxyl group-containing polymethylsiloxane compound (B-1) include a compound represented by Formula (1) or Formula (2), and a mixture of these:

[Chemical Formula 1]

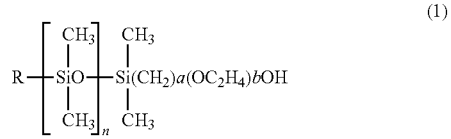

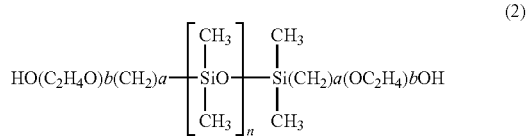

wherein

R represents a hydrocarbon group having 1 to 9 carbon atoms;

n represents an integer from 10 to 200;

a each independently represents an integer from 3 to 9; and b each independently represents an integer from 0 to 9.

<<Other hydroxyl group-containing compounds>>

As a hydroxyl group-containing compound (B) other than the hydroxyl group-containing polymethylsiloxane compound (B-1), for example, a monool compound (B-2) having a molecular weight of 2,000 or less, and a polyol compound (B-3) can be used.

When the hydroxyl group-containing compound (B) further includes a monool compound (B-2) having a molecular weight of 2,000 or less in addition to the hydroxyl group-containing polymethylsiloxane compound (B-1), it is preferable because the viscosity of the allophanate group-containing polyisocyanate composition (C) can be further lowered.

<<Monool Compound (B-2)>>

Examples of the monool compound (B-2) having a molecular weight of 2,000 or less include an aliphatic monoalcohol (B-21), an aromatic monoalcohol (B-22), an alicyclic monoalcohol (B-23), an aromatic aliphatic monoalcohol (B-24), a polyoxypropylene glycol monoalkyl ether (B-25), an alkyl ester of castor oil fatty acids (B-26), and the like.

<<<Aliphatic Monoalcohol (B-21)>>>

Examples of the aliphatic monoalcohol (B-21) include aliphatic monoalcohols such as methanol, ethanol, 1- and 2-propanol, 1- and 2-butanol, 1-pentanol, 1-hexanol, 2-methyl-1-pentanol, 4-methyl-2-pentanol, 2-ethyl-1-butanol, 1-heptanol, 1-octanol, 2-octanol, 2-ethylhexanol, 3,5-dimethyl-1-hexanol, 2,2,4-trimethyl-1-pentanol, 1-nonanol, 2,6-dimethyl-4-heptanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-hexacosanol, 1-heptatricontanol, 1-oleyl alcohol, and 2-octyldodecanol; mixtures of these, and the like.

<<<Aromatic Monoalcohol (B-22)>>>

Examples of the aromatic monoalcohol (B-22) include phenol, cresol, and the like.

<<<Alicyclic Monoalcohol (B-23)>>>

Examples of the alicyclic monoalcohol (B-23) include cyclohexanol, methylcyclohexanol, and the like.

<<<<Aromatic Aliphatic Monoalcohol (B-24)>>>

Examples of the aromatic aliphatic monoalcohol (B-24) include benzyl alcohol and the like.

<<<Polyoxypropylene Glycol Monoalkyl Ether (B-25)>>>

Regarding the polyoxypropylene glycol monoalkyl ether (B-25), for example, a reaction product of the above-described aliphatic monoalcohol (B-21) and polyoxypropylene glycol may be mentioned, and examples include polyoxypropylene methyl ether, polyoxypropylene ethyl ether, polyoxypropylene butyl ether, polyoxypropylene-2-ethylhexyl ether, polyoxypropylene oleyl ether, polyoxypropylene-2-octyldodeca ether, mixtures of these, and the like.

The molecular weight of the polyoxypropylene glycol monoalkyl ether is preferably 90 or more and 2,000 or less from the viewpoint that the molding processability and adhesive strength of the polyurethane resin are excellent, and the molecular weight is more preferably 150 or more and 1,000 or less.

<<<<Alkyl Ester of Castor Oil Fatty Acids (B-26)>>>

Examples of the alkyl ester of castor oil fatty acids (B-26) include an esterification product of castor oil and the above-mentioned aliphatic monoalcohol (B-21).

<<Polyol Compound (B-3)>>

Examples of the polyol compound (B-3) include polyether polyol (B-31), castor oil-based polyol (B-32), polyester polyol (B-33), mixtures of these, and the like.

<<<Polyetherpolyol (B-31)>>>

Examples of the polyether polyol (B-31) include polyols having 2 to 24 carbon atoms, such as ethylene glycol, diethylene glycol, propylene glycol, 1,4-butanediol, 1,6-hexanediol, neopentyl glycol, glycerin, trimethylolpropane, hexanetriol, pentaerythritol, sorbitol, sucrose, and hydrogenated bisphenol A; alkylene oxide adducts produced from mixtures of one kind or two or more kinds of these polyols as starting materials; and the like.

<<<Castor Oil-Based Polyol (B-32)>>>

Examples of the castor oil-based polyol (B-32) include castor oil, partially dehydrated castor oil, partially acylated castor oil, a transesterification product of castor oil and the polyether polyol (B-31), transesterification products of castor oil with animal oils and plant oils other than castor oil, mixtures of these, and the like.

<<<Polyester Polyol (B-33)>>>

Examples of the polyester polyol (B-33) include dehydration condensation products of one or more kinds selected from polybasic acids such as oxalic acid, adipic acid, azelaic acid, dodecanoic acid, maleic acid, fumaric acid, itaconic acid, dimerized linoleic acid, phthalic acid, isophthalic acid, terephthalic acid, 2,6-naphthalenedicarboxylic acid, 1,3-pentanedicarboxylic acid, and 1,4-hexanedicarboxylic acid, and mixtures of these, with one or more kinds selected from polyols such as ethylene glycol, diethylene glycol, propylene glycol, 1,4-butanediol, 1,6-hexanediol, neopentyl glycol, glycerin, trimethylolpropane, hexanetriol, pentaerythritol, sorbitol, sucrose, and hydrogenated bisphenol A, and mixtures of these; and the like.

<<Allophanatization Catalyst>>

Examples of an allophanatization catalyst include acetylacetone zinc; metal carboxylic acid salts of zinc, lead, tin, copper, cobalt, and the like; tertiary amines; tertiary amino-alcohols; quaternary ammonium salts; mixtures of these; and the like.

The amount of addition of the allophanatization catalyst is preferably in the range of 1 ppm or more and 1,000 ppm or less, and more preferably in the range of 10 ppm or more and 500 ppm or less, with respect to the total amount of the allophanate group-containing polyisocyanate composition (C). When the amount of addition is 1 ppm or more, the reaction rapidly proceeds, and when the amount of addition is 1,000 ppm or less, it is preferable because coloration of prepolymers can be further suppressed.

<<Catalyst Poison>>

As a catalyst poison in the case of inactivating an allophanatization reaction catalyst, an acidic substance is appropriate, and examples include anhydrous hydrogen chloride, sulfuric acid, phosphoric acid, a monoalkyl sulfuric acid ester, an alkylsulfonic acid, an alkyl benzenesulfonic acid, a mono- or dialkyl phosphoric acid ester, benzoyl chloride, and Lewis acids. Regarding the amount of addition of the catalyst poison, it is preferable to add an equivalent or more with respect to the mole number of the allophanatization catalyst, and it is preferable to add 1.0-fold molar equivalent or more and 1.5-fold molar equivalent or less.

<<Isocyanate Group Content of Allophanate Group-Containing Polyisocyanate Composition (C)>>

The isocyanate group content of the allophanate group-containing polyisocyanate composition (C) is preferably 3% by mass or more and 30% by mass or less, more preferably 5% by mass or more and 28% by mass or less, and particularly preferably 10% by mass or more and 26% by mass or less, from the viewpoint that the molding processability and adhesive strength of the polyurethane resin are excellent.

<<Viscosity (25° C.) of Allophanate Group-Containing Polyisocyanate Composition (C)>>

The viscosity at 25° C. of the allophanate group-containing polyisocyanate composition (C) is preferably 50 mPa·s or more and 10,000 mPa·s or less, more preferably 100 mPa·s or more and 5,000 mPa·s or less, and particularly preferably 200 mPa·s or more and 3,000 mPa s or less, from the viewpoint that the molding processability of the polyurethane resin is excellent.

Second Embodiment (Allophanate Group-Containing Polyisocyanate Composition)

An allophanate group-containing polyisocyanate composition (C) according to an embodiment of the present disclosure includes a reaction product of diphenylmethane diisocyanate (A) and a monool compound (B'), and
a siloxane compound (G),
wherein the content of the siloxane compound (G) is 1 ppm or more and 100 ppm or less with respect to the mass of the reaction product.

Since the present embodiment is identical to the above-described first embodiment, except for the monool compound (B') and the siloxane compound (G), both of which constitute the allophanate group-containing polyisocyanate composition (C'), further description of the configuration other than the monool compound (B') and the siloxane compound (G) will not be repeated here.

<Monool Compound (B')>

Examples of the monool compound (B') include the same compounds as the monool compound (B-2) according to the above-described first embodiment. Among these, it is preferable that the monool compound (B') includes at least one selected from the group consisting of an aliphatic monoalcohol and a polyoxypropylene glycol monoalkyl ether.

<Siloxane Compound (G)>

The siloxane compound (G) is not particularly limited so long as it is a compound having a siloxane bond. Examples include polydimethylsiloxane, a phenyl-modified polysiloxane, a hydrogen-modified polysiloxane, an amine-modified polysiloxane, a silanol-modified polysiloxane, a carbinol-modified polysiloxane, a mercapto-modified polysiloxane, mixtures of these, and the like.

Among these, polydimethylsiloxane, an amine-modified polysiloxane, a silanol-modified polysiloxane, a carbinol-modified polysiloxane, and a mercapto-modified polysiloxane are preferred, and from the viewpoints of easy handleability and easy availability, polydimethylsiloxane is particularly preferred.

The content of the siloxane compound (G) is 1 ppm or more and 100 ppm or less with respect to the mass of the reaction product of diphenylmethane diisocyanate (A) and the monool compound (B'). It is preferable that the content is 3 ppm or more and 50 ppm or less. When the content is less than 1 ppm, the amount of eluate is not sufficiently reduced, and when the content is more than 100 ppm, the allophanate group-containing polyisocyanate composition (C') and the polyurethane resin-forming composition cause poor external appearance due to separation of the siloxane compound.

Third Embodiment (Polyurethane Resin-Forming Composition)

A polyurethane resin-forming composition according to an embodiment of the present disclosure includes the above-described allophanate group-containing polyisocyanate composition (C) or allophanate group-containing polyisocyanate composition (C) and a polyol component (D)

<Polyol Component (D)>

The polyol component (D) that reacts with the allophanate group-containing polyisocyanate composition (C) or the allophanate group-containing polyisocyanate composition (C) and forms a polyurethane resin-forming composition is not particularly limited, and any compound containing an active hydrogen group can all be used. Examples include a low-molecular weight polyol, a polyether-based polyol, a polyester-based polyol, a polylactone-based polyol, a castor oil-based polyol, a polyolefin-based polyol, a hydroxyl group-containing amine-based compound, and the like. These can be used singly or in combination of two or more kinds thereof. Among these, a castor oil-based polyol is preferred because it has excellent chemical resistance and eluate resistance.

<<Low-Molecular Weight Polyol>>

Examples of the low-molecular weight polyol include low-molecular weight dihydric polyols such as ethylene glycol, diethylene glycol, propylene glycol, 1,2-, 1,3- or 1,4-butanediol, 1,5-pentanediol, 3-methyl-1,5-pentanediol, 1,6-hexane glycol, 1,8-octanediol, 1,10-decanediol, neopentyl glycol, and hydrogenated bisphenol A; low-molecular weight trihydric or higher-hydric polyols such as glycerin, trimethylolpropane, hexanetriol, pentaerythritol, and sorbitol; and the like. The molecular weight of the low-molecular weight polyol is preferably 50 or more and 200 or less.

<<Polyether-Based Polyol>>

Examples of the polyether-based polyol include alkylene oxide (alkylene oxide having 2 to 4 carbon atoms, for example, ethylene oxide, propylene oxide, butylene oxide, and the like) adducts of the above-described low-molecular weight polyols, ring-opening polymerization products of alkylene oxides, and the like. Specific examples include polypropylene glycol, polyethylene glycol, polytetramethylene ether glycol, tipped ether which is a copolymer of ethylene oxide and propylene oxide, and the like. The number average molecular weight of the polyether-based polyol is preferably 200 or more and 7,000 or less, and even more preferably 500 or more and 5,000 or less, from the viewpoint of having excellent molding processability during the production of a seal material.

<<Polyester-Based Polyol>>

Regarding the polyester-based polyol, for example, a polyol obtained by a polycondensation reaction between a polycarboxylic acid and a polyol, and the like may be mentioned. The number average molecular weight of the polyester-based polyol is preferably 200 or more and 5,000 or less, and more preferably 500 or more and 3,000 or less, from the viewpoint of having excellent molding processability during the production of a seal material. Examples of the polycarboxylic acid include aliphatic saturated or unsaturated polycarboxylic acids, for example, azelaic acid, dodecanoic acid, maleic acid, fumaric acid, itaconic acid, ricinoleic acid, and dimerized linoleic acid; aromatic polycarboxylic acids such as phthalic acid, isophthalic acid, and terephthalic acid; and the like. Regarding the polyol, at least one selected from the group consisting of the above-described low-molecular weight polyol and the above-described polyether-based polyol may be mentioned.

<<Polylactone-Based Polyol>>

Regarding the polylactone-based polyol, a polyol obtained by subjecting at least one selected from the group consisting of ε-caprolactone, α-methyl-ε-caprolactone, ε-methyl-ε-caprolactone, β-methyl-σ-valerolactone, and the like to addition polymerization to a polymerization initiator such as a glycol or a triol in the presence of a catalyst, and the like may be mentioned. Examples of the catalyst include an organometallic compound, a metal chelate compound, a fatty acid metal acyl compound, and the like. The number average molecular weight of the polylactone-based polyol is preferably 200 or more and 5,000 or less, and more preferably 500 or more and 3,000 or less, from the viewpoint of having excellent molding processability during the production of a seal material.

<<Castor Oil-Based Polyol>>

Regarding the castor oil-based polyol, a linear or branched polyester obtained by a reaction between castor oil fatty acids and a polyol (at least one selected from the group consisting of the above-described low-molecular weight polyol and the polyether-based polyol) may be mentioned. Examples of the linear or branched polyester include diglycerides and monoglycerides of castor oil fatty acids, mono-, di- or triesters of castor oil fatty acids and trimethylolalkanes, mono-, di- or triesters of castor oil fatty acids and polypropylene glycol, and the like. The number average molecular weight of the castor oil-based polyol is preferably 300 or more and 4,000 or less from the viewpoint of having excellent molding processability during the production of a seal material, and the number average molecular weight is more preferably 500 or more and 3,000 or less.

<<Polyolefin-Based Polyol>>

Regarding the polyoletin-based polyol, for example, a polybutadiene-based polyol obtained by introducing a hydroxyl group into the ends of polybutadiene or a copolymer of butadiene and styrene or acrylonitrile, and the like may be mentioned.

In addition to that, a polyether ester-based polyol obtained by subjecting a polyester having at least one selected from the group consisting of a carboxyl group and a hydroxyl group at the ends, to an addition reaction with an alkylene oxide such as ethylene oxide or propylene oxide, and the like may be mentioned.

<<Hydroxyl Group-Containing Amine-Based Compound>>

Regarding the hydroxyl group-containing amine-based compound, for example, an aminoalcohol obtained by adding an alkylene oxide to an amino compound, and the like may be mentioned.

Examples of the aminoalcohol include N,N,N',N'-tetrakis[2-hydroxypropyl]ethylenediamine and N,N,N',N'-tetrakis[2-hydroxyethyl]ethylenediamine, which are propylene oxide or ethylene oxide adduct of an amino compound such as ethylenediamine; mono-, di- and triethanolamine, N-methyl-N,N-diethanolamine, N-ethyl-N,N-diethanolamine, N-propyl-N,N-diethanolamine, N-butyl-N,N-diethanolamine, N-hexyl-N,N-diethanolamine, N-cyclohexyl-N,N-diethanolamine, N-lauryl-N,N-diethanolamine, N-ethanol-N,N-di[2-hydroxypropanol]amine, and mixtures of these.

Among these, in a case in which it is wished to enhance the heat resistance of the polyurethane resin, N,N,N',N'-tetrakis[2-hydroxypropyl]ethylenediamine and N,N,N',N'-tetrakis[2-hydroxyethyl]ethylenediamine are effective.

Furthermore, among these, in a case in which it is wished to lower the viscosity of the polyol (D), N-lauryl-N,N-diethanolamine and N-ethanol-N,N-di[2-hydroxypropanol]amine are preferred.

The amount of incorporation in the case of using the hydroxyl group-containing amine-based compound is preferably in the range of 1% by mass or more and 50% by mass or less, and particularly preferably in the range of from 5% by mass or more and 40% by mass or less, in the polyol component (D). When the proportion in the polyol component (D) is 1% by mass or more, a catalytic effect of a hydroxyl group-containing amine-based compound is satisfactorily obtained. When the proportion is 50% by mass or less, since the reactivity is appropriately suppressed, workability is further improved, and the packability into a module becomes superior.

Regarding the polyurethane resin-forming composition, the molar ratio of isocyanate groups of the allophanate group-containing polyisocyanate composition (C) or the allophanate group-containing polyisocyanate composition (C) and active hydrogen groups of the polyol component (D) (isocyanate groups/active hydrogen groups) is preferably in the range of 0.8 or more and 1.6 or less, and particularly preferably in the range of 0.9 or more and 1.2 or less. According to a polyurethane resin-forming composition obtainable at such a mixing proportion, a polyurethane resin-forming composition having excellent durability and having a very small amount of eluate from the polyurethane resin in a liquid such as water or blood is obtained.

Incidentally, if necessary, known urethanization catalysts, such as a metal compound-based catalyst such as an organo-tin compound that accelerates a reaction between the isocyanate groups of the allophanate group-containing polyisocyanate composition (C) or the allophanate group-containing polyisocyanate composition (C) and the active hydrogen groups of the polyol component (D); and a tertiary amine catalyst such as triethylenediamine (TEDA), tetramethylhexamethylenediamine (TMHMDA), pentamethylethylenetriamine (PMDETA), dimethylcyclohexylamine (DMCHA), or bisdimethyl aminoethyl ether (BDMAEA), can be used.

Fourth Embodiment (Seal Material)

A seal material according to an embodiment of the present disclosure includes a cured product of the above-described polyurethane resin-forming composition. In this case, it is preferable that the seal material is transparent to the extent that from one side to the other side of the seal material can be visually inspected. Particularly, with regard to a seal material for a hollow fiber membrane module that constitutes a separation apparatus for medical and industrial uses, it is required that the seal material is not turbid when visually inspected in order to check incorporation of foreign materials.

The allophanate group-containing polyisocyanate composition (C) or the allophanate group-containing polyisocyanate composition (C) becomes a cured product of the polyurethane resin-forming composition when reacted with the polyol component (D). The cured product of the polyurethane resin-forming composition can be used as various seal materials. Above all, since the amount of an extract eluted from the polyurethane resin thus obtained is small, the cured product of the polyurethane resin-forming composition is useful as a seal material for a membrane module that constitutes a separation apparatus for medical and industrial uses.

In a case in which a membrane seal material for a module that uses a hollow or flat membrane-shaped fiber separation membrane is obtained by using the polyurethane resin-forming composition, the composition may be caused to react at room temperature, or the allophanate group-containing polyisocyanate composition (C) or the allophanate group-containing polyisocyanate composition (C) and the polyol component (D) may be respectively heated to 30° C. to 60° C. and caused to react, in order to shorten the gelation time or to decrease the mixed viscosity.

Fifth Embodiment (Membrane Module)

A membrane module according to an embodiment of the present disclosure comprises:
 a main body unit;
 a membrane; and
 a seal material that seals the gaps between the main body unit and the membrane, and
 the seal material is the above-mentioned seal material.

Next, the membrane module according to an embodiment of the present disclosure will be described in more detail with reference to the drawings.

FIG. 1 is a conceptual diagram illustrating an example of the configuration of the membrane module according to an embodiment of the present disclosure.

A membrane module (hollow fiber membrane module) 100 illustrated in FIG. 1 comprises a housing (main body unit) 11, and the interior of the housing is packed with a plurality of hollow fiber membranes (membranes) 13. For example, in the case of a hollow fiber membrane module used as a dialyzer, several thousand to several ten thousand sheets of hollow fiber membranes are packed.

A first fluid inlet port 15 and a first fluid outlet port 17 are provided on a side surface of the housing 11, and a first fluid (gas or liquid) flows in and out of the housing 11 through these ports. The first fluid that has flowed in through the first fluid inlet port 15 comes into contact with the plurality of hollow fiber membranes 13 packed inside the housing 11 and passes through the gaps therebetween (outside of the hollow fiber membranes), and the first fluid is discharged through the first fluid outlet port 17. Meanwhile, since a seal material 19 does not exist inside the hollow fiber membranes 13, a second fluid (gas or liquid) flows in and out through a second fluid inlet port (one end side) and a second fluid outlet port (the other end side) provided in a cap member, which is not illustrated in the diagram, inside the hollow fiber membranes 13. Then, when the first fluid and the second fluid come into contact with each other through the hollow fiber membranes 13, mass transfer from the inside of one fluid to the inside of the other fluid (or further from the inside of the other fluid to the inside of the one fluid) occurs.

For example, in the case of a hollow fiber membrane type dialyzer, when a dialysate comes into contact with blood, waste products and excess water in the blood transfer to the dialysate.

The membrane module 100 illustrated in FIG. 1 is configured such that the membrane module 100 comprises the plurality of hollow fiber membranes 13, and the seal material 19 encapsulates the gaps at both ends of those membranes; however, the membrane module according to the present embodiment is not limited by any means to such a configuration. For example, a plurality of membranes or a single membrane, all having various shapes such as a flat membrane shape and a spiral membrane shape, may be used. Furthermore, the seal material is not limited to the configuration of being provided at both ends of the membranes, and may also be provided only at a portion of the membranes (in the case of a hollow fiber form, one end) or may be provided in the entirety of the ends of the membranes, for example, the entirety of the outer edge of flat membranes. Furthermore, the seal material may be configured such that the seal material is provided in parts other than the ends of the membranes and encapsulate the membranes. Also, the housing 11 of the membrane module 100 illustrated in FIG. 1 has a cylindrical shape; however, any shape other than a cylindrical shape may also be employed.

The membrane module 100 can be produced by sealing the mutual gaps between the hollow fiber membranes 13 at the ends of a bundled body of the plurality of hollow fiber membranes 13 using the above-mentioned polyurethane resin-forming composition, curing the composition, and thereby forming the above-mentioned seal material (the mutual gaps between the hollow fiber membranes are sealed by the seal material).

In the membrane module according to an embodiment of the present disclosure, since the production of an extract is satisfactorily suppressed, the membrane module can be suitably used as a module for medical use or water treatment. Specific examples of the membrane module include a blood plasma separation apparatus, an artificial lung, an artificial kidney, an artificial liver, and a domestic or industrial water treatment apparatus.

In the following description, exemplary embodiments of the present disclosure will be disclosed in the following [1] to [9].

[1]: An allophanate group-containing polyisocyanate composition (C) including a reaction product of diphenylmethane diisocyanate (A) and a hydroxyl group-containing compound (B),
wherein the reaction product includes an allophanate group,
the hydroxyl group-containing compound (B) includes a hydroxyl group-containing polymethylsiloxane compound (B-1), and
a content of the hydroxyl group-containing polymethylsiloxane compound (B-1) is 1 ppm or more and 300 ppm or less with respect to a total amount of the diphenylmethane diisocyanate (A) and the hydroxyl group-containing compound (B).

[2]: The allophanate group-containing polyisocyanate composition (C) according to [1], wherein the content of the hydroxyl group-containing polymethylsiloxane compound (B-1) is 1 ppm or more and 200 ppm or less.

[3]: The allophanate group-containing polyisocyanate composition (C) according to [1], wherein the content of the hydroxyl group-containing polymethylsiloxane compound (B-1) is 1 ppm or more and 100 ppm or less.

[4]: The allophanate group-containing polyisocyanate composition (C) according to any one of [1] to [3], wherein the hydroxyl group-containing compound (B) further includes a monool compound (B-2) having a molecular weight of 2,000 or less.

[5]: An allophanate group-containing polyisocyanate composition (C) including:
a reaction product of diphenylmethane diisocyanate (A) and a monool compound (B'); and
a siloxane compound (G),
wherein the reaction product includes an allophanate group, and
a content of the siloxane compound (G) is 1 ppm or more and 100 ppm or less with respect to the mass of the reaction product.

[6]: A polyurethane resin-forming composition including the allophanate group-containing polyisocyanate composition (C) according to any one of [1] to [5] and a polyol component (D).

[7]: A seal material including a cured product of the polyurethane resin-forming composition according to [6].

[8]: A membrane module including:
a main body unit;
a membrane; and
a seal material sealing gaps between the main body unit and the membrane,
wherein the seal material is the seal material according to [7].

[9]: The membrane module according to [8],
wherein the membrane is a plurality of lines of hollow fiber membranes, and
the seal material seals the gaps between the main body unit and at least a portion of the plurality of lines of hollow fiber membranes, and at least a portion of mutual gaps between the plurality of lines of hollow fiber membranes.

EXAMPLES

Hereinafter, the present invention will be described; however, the present invention is not intended to be construed to be limited to these Examples. Incidentally, unless particularly stated otherwise, the unit "%" in the following means "% by mass".

The following components were used in Examples and Comparative Examples.

[Diphenylmethane Diisocyanate (A)]
A1; 4,4'-MDI (manufactured by Tosoh Corporation, product name Millionate MT, isocyanate group content=33.6%)
A2; Mixture of 2,4'-MDI and 4,4'-MDI (manufactured by Tosoh Corporation, product name Millionate NM, isocyanate group content=33.6%)
[Hydroxyl Group-Containing Compound (B)]
[Siloxane Compound (B-1)]
Siloxane compound B11; Polydimethylsiloxane containing hydroxyl groups at both terminals (manufactured by Shin-Etsu Chemical Co., Ltd., product name KF-6001, OHV=62 mgKOH/g)
Siloxane compound B12; Polydimethylsiloxane containing hydroxyl group at one of the tenminals (manufactured by Shin-Etsu Chemical Co., Ltd., product name X-22-170BX, OHV=20 mgKOH/g)
[Monool (B-2)]
B21; Tridecanol (manufactured by KH Neochem Co., Ltd.)
B22; 2-Octyldodecanol (manufactured by Kao Corp., product name KALCOL 200GD)

B23; Polyoxypropylene glycol mono-2-ethylhexyl ether (manufactured by Lion Specialty Chemicals Co., Ltd., product name LEOCON 1015H, OHV=70 mgKOH/g)

[Catalyst]

Catalyst; Acetylacetone zinc (manufactured by Tokyo Chemical Industry Co., Ltd.)

[Catalyst Poison]

Catalyst poison; Benzoyl chloride (manufactured by Tokyo Chemical Industry Co., Ltd.)

[Polyol Component (D)]

Castor oil (manufactured by ITO OIL CHEMICALS CO., LTD., product name CASTOR OIL LAV, OHV=160 mgKOH/g)

N,N,N',N'-tetrakis[2-hydroxypropyl]ethylenediamine (manufactured by ADEKA Corporation, product name EDP-300, hydroxyl group value=760 mgKOH/g)

[Siloxane Compound (G)]

Siloxane compound G1; Polydimethylsiloxane (manufactured by Dow Corning Toray Co., Ltd., product name ACP-1500)

The term "predetermined amount" as used in Synthesis Examples, Examples, and Comparative Examples that will be described below refers to the respective composition amounts described in Table 1 and Table 2.

Prepolymer Synthesis Example 1

A predetermined amount of MDI A1 was added into a four-necked flask having a volume of 1 liter, and while the content was stirred under a nitrogen gas stream, the temperature was adjusted to 50° C. Next, predetermined amounts of siloxane compound B11 and monool B21 were added thereto under stirring, and after heat generation of a urethanization reaction had subsided, the temperature was raised to 90° C. When the internal temperature was stabilized at 90° C., a predetermined amount of the catalyst was added thereto, and the mixture was caused to react for 4 hours at 90° C. After that, the catalyst poison was added thereto to terminate the reaction, and prepolymer C-1 was obtained. Prepolymer C-1 was a yellow transparent liquid. The properties are described in Table 1.

Prepolymer Synthesis Examples 2 to 4 and Prepolymer Comparative Synthesis Examples 1 and 2

Prepolymers were synthesized by operations similar to that of Prepolymer Synthesis Example 1, by changing the components A (A1 and A2), components B-1 (B11 and B12), and components B-2 (B21 and B22) to the compositions indicated in Table 1. The properties are described in Table 1.

Furthermore, the external appearance of prepolymers C-1 to C-6 was evaluated by visual inspection, and a prepolymer in which turbidity was not recognized was considered clear, while a prepolymer in which even slight turbidity was recognized was considered turbid. The results are presented in Table 1.

Incidentally, the viscosity at 25° C. was measured using a rotary viscometer (B type, No. 3 rotor) in an atmosphere at 25° C.

TABLE 1

|  |  | Synthesis Example 1 | Synthesis Example 2 | Synthesis Example 3 | Synthesis Example 4 | Comparative Synthesis Example 1 | Comparative Synthesis Example 2 |
|---|---|---|---|---|---|---|---|
| Prepolymer name | | C-1 | C-2 | C-3 | C-4 | C-5 | C-6 |
| Composition (g) | MDI A1 | 808 | 808 | 231 | 204 | 808 | 808 |
| | MDI A2 | | | 538 | 476 | | |
| | Siloxane compound B11 | 0.05 | | | | | |
| | Siloxane compound B12 | | 0.01 | 0.01 | 0.01 | | 0.50 |
| | Monool B21 | 192 | 192 | 231 | | 192 | 192 |
| | Monool B22 | | | | 320 | | |
| | Acetylacetone zinc | 0.20 | 0.20 | 0.20 | 0.20 | 0.20 | 0.20 |
| | Benzoyl chloride | 0.28 | 0.28 | 0.28 | 0.28 | 0.28 | 0.28 |
| Content of siloxane compound in prepolymer (ppm) | | 50 | 10 | 10 | 10 | 0 | 500 |
| Properties | NCO content (%) | 19.1 | 19.1 | 16.1 | 13.8 | 19.1 | 19.1 |
| | Viscosity at 25° C. (mPa · s) | 800 | 800 | 3000 | 2500 | 800 | 800 |
| | External appearance | Clear | Clear | Clear | Clear | Clear | Turbid |

Polyol Preparation Example 75 parts by mass of castor oil and 25 parts by mass of N,N,N',N'-tetrakis[2-hydroxypropyl]ethylenediamine were mixed, and polyol component D-1 (OHV=310 mgKOH/g) was prepared.

Examples 1 to 4 and Comparative Example 1

Prepolymers and polyols were mixed at the blending compositions indicated in Table 2, and defoaming properties were evaluated by the defoaming properties evaluation method described below. The results are presented in Table 2.

<Defoaming Properties Evaluation Method>
1) A prepolymer and a polyol, whose temperature has been adjusted to 25° C., are weighted out in a 300-ml polypropylene (PP) cup at the proportions indicated in Table 2.
2) The mixture is stirred for 10 seconds at 500 rpm using a clover blade attached to a rotary machine, and a blend liquid is obtained.
3) 20 ml of the blend liquid is transferred into a 100-ml PP cup.
4) The PP cup of 3) is mounted in a filtration bell equipped with a vacuum pump, and pressure reduction is initiated.
5) The pressure is reduced to an absolute pressure of 70 mmHg at 20 seconds from the initiation of pressure reduction.
6) The height of foam obtained 60 seconds after the initiation of pressure reduction is read out from the volume of the 100-ml PP cup.

A blend liquid having satisfactory defoaming properties also first inflates; however, foam breaks at about 20 to 30 seconds after the initiation of defoaming, and the volume returns close to the original volume (20 ml). A blend liquid having poor defoaming properties inflates and remains so without foam breaking. In the above-described test, a prepolymer having a volume of 20 ml or more and 50 ml or less after 60 seconds from the initiation of pressure reduction can be instantly supplied to molding, and therefore, the prepolymer can be considered to have satisfactory defoaming properties.

TABLE 2

|  |  | Example 1 | Example 2 | Example 3 | Example 4 | Comparative Example 1 |
|---|---|---|---|---|---|---|
| Blending composition | Prepolymer C-1 | 55 |  |  |  |  |
|  | Prepolymer C-2 |  | 55 |  |  |  |
|  | Prepolymer C-3 |  |  | 60 |  |  |
|  | Prepolymer C-4 |  |  |  | 63 |  |
|  | Prepolymer C-5 |  |  |  |  | 55 |
|  | Polyol D-1 | 45 | 45 | 40 | 37 | 45 |
| Defoaming properties (ml) |  | 25 | 25 | 25 | 20 | 100< |

Prepolymer Synthesis Example 11

A predetermined amount of MDI A1 was added into a four-necked flask having a volume of 1 liter, and while the content was stirred under a nitrogen gas stream, the temperature was adjusted to 50° C. Next, a predetermined amount of B23 was added thereto under stirring, and after heat generation of a urethanization reaction had subsided, the temperature was raised to 90° C. When the internal temperature was stabilized at 90° C., a predetermined amount of the catalyst was added thereto, and the mixture was caused to react for 4 hours at 90° C. Predetermined amounts of the catalyst poison and the siloxane compound G were added thereto to terminate the reaction, and prepolymer C-11 was obtained. Prepolymer C-11 was a pale-yellow transparent liquid. The properties are described in Table 3.

TABLE 3

|  |  | Synthesis Example |  |  |  |  |  |  |  |  | Comparative Synthesis Example |  |  |
|---|---|---|---|---|---|---|---|---|---|---|---|---|---|
|  |  | 11 | 12 | 13 | 14 | 15 | 16 | 17 | 18 | 19 | 20 | 21 | 22 |
|  |  | C-11 | C-12 | C-13 | C-14 | C-15 | C-16 | C11-7 | C-18 | C-19 | C-20 | C-21 | C-22 |
| Composition (g) | MDI A1 | 510 |  | 510 | 510 | 510 | 510 | 510 | 764 |  | 510 | 510 | 510 |
|  | MDI A2 |  | 510 |  |  |  |  |  |  | 764 |  |  |  |
|  | Monool B23 | 490 | 490 | 490 | 490 | 490 | 490 | 490 |  |  | 490 | 490 | 490 |
|  | Monool B22 |  |  |  |  |  |  |  | 236 | 236 |  |  |  |
|  | Acetylacetone zinc | 0.1 | 0.1 | 0.1 | 0.1 | 0.1 | 0.1 | 0.1 | 0.1 | 0.1 | 0.1 | 0.1 | 0.1 |
|  | Benzoyl chloride | 1.4 | 1.4 | 1.4 | 1.4 | 1.4 | 1.4 | 1.4 | 1.4 | 1.4 | 1.4 | 1.4 | 1.4 |
| Composition (ppm) | Siloxane compound G | 5 | 5 | 1 | 3 | 10 | 50 | 80 | 5 | 5 | 0 | 0.5 | 300 |
| Properties | NCO content (%) | 12 | 12 | 12 | 12 | 12 | 12 | 12 | 19 | 19 | 12 | 12 | 12 |
|  | Viscosity at 25° C. (mPa · s) | 900 | 950 | 910 | 900 | 900 | 890 | 890 | 1000 | 1030 | 1000 | 900 | 890 |
|  | External appearance | Clear | Clear | Clear | Clear | Clear | Clear | Clear | Clear | Clear | Clear | Clear | Turbid |

Prepolymer Synthesis Examples 12 to 19 and Comparative Synthesis Examples 20 to 22

The component A and the component B were changed to the compositions indicated in Table 3, and prepolymers C-11 to C-22 were synthesized by operations similar to that of Synthesis Example 11. The properties of the prepolymers are presented in Table 3. The method for measuring the viscosity is the same method as described above.

Polyol Preparation Example 70 parts by mass of castor oil and 30 parts by mass of N,N,N',N'-tetrakis[2-hydroxypropyl]ethylenediamine were mixed, and polyol component D-2 was prepared.

Examples 11 to 19 and Comparative Examples 11 to 13

A prepolymer (base agent (A)) and a polyol were mixed at the blending compositions indicated in Table 4, and the defoaming properties were evaluated by a defoaming properties evaluation method similar to that for Examples 1 to 4 and Comparative Example 1. The results are presented in Table 4.

Furthermore, urethane resin compositions were molded at the compositions indicated in Table 4, and extraction ratios were evaluated by the extraction test procedure described below. The results are presented in Table 4.

<Extraction Test Procedure>
1) Each of the polyurethane resin-forming compositions according to Examples 11 to 19 and Comparative Examples 20 to 22 was defoamed under reduced pressure (for 1 minute at 10 to 20 kPa), and then a sheet was formed on a release paper so as to have a thickness of about 1 to 2 mm.
2) This was cut out into a square that measured 1 cm on each side, methanol was added thereto in an amount equivalent to 10 times the resin weight, and the mixture was shaken for 24 hours in an atmosphere at 25° C.
3) After filtering and drying, the extraction ratio was calculated from the resin weights measured before and after extraction.

<External Appearance Evaluation Procedure>
The external appearance of prepolymers C-11 to C-22 and the resin compositions was evaluated by visual inspection, and a sample in which turbidness was not recognized was considered clear, while a sample in which even slight turbidness was recognized was considered turbid. The results are presented in Tables 3 and 4.

TABLE 4

| | | Example | | | | | | | | | Comparative Example | | |
|---|---|---|---|---|---|---|---|---|---|---|---|---|---|
| | | 11 | 12 | 13 | 14 | 15 | 16 | 17 | 18 | 19 | 11 | 12 | 13 |
| Composition | Base agent (A) | C-11 | C-12 | C-13 | C-14 | C-15 | C-16 | C11-7 | C-18 | C-19 | C-20 | C-21 | C-22 |
| | Polyol (D) | D-2 | D-2 | D-2 | D-2 | D-2 | D-2 | D-2 | D-2 | D-2 | D-2 | D-2 | D-2 |
| | NCO/OH (molar ratio) | 1.00 | 1.00 | 1.00 | 1.00 | 1.00 | 1.00 | 1.00 | 1.00 | 1.00 | 1.00 | 1.00 | 1.00 |
| Properties | External appearance | Clear | Clear | Clear | Clear | Clear | Clear | Clear | Clear | Clear | Clear | Clear | Turbid |
| | Extraction ratio (%) | 1.0 | 1.2 | 1.4 | 1.0 | 1.1 | 1.2 | 1.5 | 1.0 | 1.1 | 2.5 | 2.5 | 2.2 |
| | Defoaming properties (ml) | 30 | 30 | 40 | 35 | 25 | 25 | 20 | 30 | 30 | 100< | 80 | 20 |

The present invention has been described in detail with reference to particular embodiments; however, it is obvious to those ordinarily skilled in the art that various modifications and amendments can be added without departing from the essence and scope of the present invention.

The entirety of the specification, claims, drawings, and abstract of Japanese Patent Application No. 2018-139332, filed on Jul. 25, 2018, is incorporated herein by reference as the disclosure of the specification of the present invention.

REFERENCE SIGNS LIST

11: housing (main body unit), 13: hollow fiber membrane, 15: first fluid inlet port, 17: first fluid outlet port, 19: seal material.

The invention claimed is:

1. An allophanate group-containing polyisocyanate composition (C) comprising a reaction product of diphenylmethane diisocyanate (A) and a hydroxyl group-containing compound (B),
wherein the reaction product includes an allophanate group,
the hydroxyl group-containing compound (B) includes a hydroxyl group-containing polymethylsiloxane compound (B-1) and a monool compound (B-2) having a molecular weight of 2,000 or less, and
a content of the hydroxyl group-containing polymethylsiloxane compound (B-1) in the reaction mixture is 1 ppm or more and 300 ppm or less with respect to a total amount of the diphenylmethane diisocyanate (A) and the hydroxyl group-containing compound (B), and
a content of the monool compound (B-2) in the reaction mixture is 19.2 mass % or more and 32.0 mass % or less with respect to a total amount of the diphenylmethane diisocyanate (A) and the hydroxyl group-containing compound (B).

2. The allophanate group-containing polyisocyanate composition (C) according to claim 1, wherein the content of the hydroxyl group-containing polymethylsiloxane compound (B-1) is 1 ppm or more and 200 ppm or less.

3. The allophanate group-containing polyisocyanate composition (C) according to claim 1, wherein the content of the hydroxyl group-containing polymethylsiloxane compound (B-1) is 1 ppm or more and 100 ppm or less.

4. A polyurethane resin-forming composition comprising the allophanate group-containing polyisocyanate composition (C) according to claim 1 and a polyol component (D).

5. A seal material comprising a cured product of the polyurethane resin-forming composition according to claim 4.

6. A membrane module comprising:
a main body unit;
a membrane; and
a seal material sealing gaps between the main body unit and the membrane,
wherein the seal material is the seal material according to claim 5.

7. The membrane module according to claim 6,
wherein the membrane is a plurality of lines of hollow fiber membranes, and
the seal material seals the gaps between the main body unit and at least a portion of the plurality of lines of hollow fiber membranes, and at least a portion of mutual gaps between the plurality of lines of hollow fiber membranes.

* * * * *